(12) United States Patent
Ruck et al.

(10) Patent No.: US 6,795,188 B2
(45) Date of Patent: Sep. 21, 2004

(54) HIGH-ACCURACY WAVEMETER

(75) Inventors: Clemens Ruck, Bondorf (DE); Emmerich Mueller, Boeblingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/910,382

(22) Filed: Jul. 20, 2001

(65) Prior Publication Data

US 2002/0030818 A1 Mar. 14, 2002

(30) Foreign Application Priority Data

Aug. 16, 2000 (EP) .......................................... 00117607

(51) Int. Cl.$^7$ .............................................. G01N 21/25
(52) U.S. Cl. ...................... 356/416; 356/402; 356/408
(58) Field of Search ................... 356/402, 408, 356/416; 372/9, 20; 250/250, 226

(56) References Cited

U.S. PATENT DOCUMENTS

| | | | | |
|---|---|---|---|---|
| 4,864,578 | A | | 9/1989 | Proffitt et al. ................. 372/20 |
| 5,515,169 | A | * | 5/1996 | Cargill et al. ................ 250/226 |
| 5,780,843 | A | | 7/1998 | Cliche et al. ................ 250/226 |
| 5,991,324 | A | * | 11/1999 | Knowles et al. ............. 372/100 |
| 6,043,883 | A | * | 3/2000 | Leckel et al. ................ 356/454 |

FOREIGN PATENT DOCUMENTS

| | | | |
|---|---|---|---|
| DE | 39 29 845 | 3/1991 | |
| DE | 4114407 A1 | * 11/1992 | ............. G01J/9/02 |
| EP | 41 14 407 | 5/1992 | |
| JP | 09089674 | 4/1997 | |

OTHER PUBLICATIONS

D. Derickson, 'Fiber optic test and measurement', Prentice–Hall, New Jersey, 1998, pp. 131–168.*
G. R. Fowles, "Introduction to Modern Optics", Dover Publications, New York, 1968, pp. 96–99.*
De Buyzer, H, examiner, European Search Report, Application No. EP 00 11 7607.

* cited by examiner

*Primary Examiner*—Thong Nguyen
*Assistant Examiner*—Arnel C. Lavarias

(57) ABSTRACT

A wavemeter for determining a wavelength of an incoming optical beam. The wavemeter comprises a coarse-measuring unit determining in a first wavelength range a first wavelength value as representing the wavelength of the incoming optical beam, and a fine-measuring unit providing a wavelength determination for the incoming optical beam that is ambiguous within the first wavelength range but unambiguous in each of a plurality of unambiguous wavelength ranges, so that a plurality of different wavelength values correspond to a measuring value as measured by the fine-measuring unit for the incoming optical beam. The wavemeter further comprises an evaluation unit for determining a second wavelength range as the one of the plurality of unambiguous wavelength ranges that covers the first wavelength value, and for determining a second wavelength value as the one of the plurality of different wavelength values that corresponds to the measuring value in the second wavelength range. The second wavelength value is output as measuring result of the wavemeter representing the wavelength of the incoming optical beam.

27 Claims, 2 Drawing Sheets

HIGH-ACCURACY WAVEMETER

BACKGROUND OF THE INVENTION

1. Field of the Invention

The present invention relates to wavemeters for determining the wavelength of an optical beam.

2. Discussion of the Background Art

Wavemeters, i.e. devices for determining the wavelength of an optical beam, are well known in the art. While the main application of wavemeters is to determine the wavelength per se, they can also be applied for tuning a variable (or tunable) laser source. In the latter case, the optical beam can be regarded as being substantially monochromatic, so that the wavemeter fulfils the task of determining the precise wavelength of the variable laser source. In case that the measured wavelength does not coincide with the expected wavelength to be emitted by the variable laser source, adequate correction means might be provided for tuning the variable laser source to the expected or preset wavelength.

A first general principle for determining the optical wavelength makes use of changes in the characteristic properties of some materials in dependency of the wavelength. DE-A-3929845 discloses a dual detector with at least two detectors with different spectral sensitivity and a computer for determining the incident light wavelength from the photocurrent difference or ratio. A similar dual detector is disclosed in DE-A-3030210.

Variable wavelength filters are disclosed e.g. in JP-A-9089674 or GB-A 2288013. In JP-A-9089674, a wavelength detector includes a wavelength independent branching part into which a light beam is input. The branched output is passed to a wavelength-dependent branching part from which a pair of outputs is obtained. The outputs of the wavelength-dependent branching part are passed alternately to a photo-detector through an optical switch. The photo-detector detects the wavelength of the measured light from the ratio of the two outputs. According to GB-A-2288013, an optical fiber-based wavelength meter comprises two serially connected fused optical fiber couplers whose outputs are connected to a photo-detector with wavelength-sensitive gradients of coupling ratios of outputs being of opposite sign and outputs connected to a signal processor.

The above mentioned methods for determining the wavelength based on changes in the characteristic properties dependent on the wavelengths are generally only applicable for determining the wavelength of monochromatic signals and generally exhibit a poor accuracy.

A second possibility for determining the wavelengths applies the principles of diffraction or reflection at optical gratings. In the former case, light is emitted onto a grating, and the angle of the deflected beams indicates the wavelength. Although this solution generally allows determining the wavelength also of polychromatic optical signals, typical drawbacks are poor accuracy and the restriction in wavelengths of typically applicable detectors such as CCD-arrays.

A third possibility for determining the wavelength applies the principle of interference using interferometers such as Fabry-Perot or Fizeau. Those solutions are generally difficult to calibrate and applicable only in a narrow wavelength range.

A further interferometric solution makes use of the interferometric properties of etalons, i.e. plane parallel plates of glass or fused quartz with reflecting surfaces. Due to the interference at the surfaces within the etalon, the light beam transmitted through the etalon exhibits a wavelength dependent transmission characteristics, generally showing a sinus or cosines shape. As disclosed in EP-A-875743, the wavelength resolution can be significantly improved by combining two etalons with different phase dependencies on the wavelength. By providing a phase shift (in particular of n/2) between the two curves, the problem of the ambiguous turn points in the sinus-or cosines-like shapes can be avoided and a tangent relationship on the wavelength can be achieved. Instead of using two separated etalon elements, one birefringent element can be provided in combination with corresponding polarizing elements. Since the resulting transmission-over-wavelength characteristic is not unambiguous due to the periodicity of the curves, main applications are fine-tuning of variable laser sources, whereby the wavelength location is already roughly known and can therefor be assigned to a corresponding period of the curve.

DE-A-4114407 discloses an arrangement for determining the air path wavelength of a light source. Using an already known starting value for the air path wavelength, a current wavelength value is determined based on thermodynamic parameters of the ambient air.

U.S. Pat. No. 4,864,578 (Proffitt) discloses a scannable laser with integral wavemeter. The wavemeter comprises a fine wavelength read-out based on an ambiguous interferometric wavelength determination, and a course wavelength read-out making use of optically active quartz crystals. The amount of polarization rotation is measured as a sample light beam passes along its axis, and this is correlated to the wavelength of the light beam. Both wavelength read-outs are then utilized to determine the wavelength of the incoming light beam.

SUMMARY OF THE INVENTION

It is an object of the present invention to provide an improved wavemeter. The object is solved by the independent claims. Preferred embodiments are shown by the dependent claims.

A wavemeter according to the invention for determining the wavelength of an incoming optical beam comprises a coarse-measuring unit and a fine-measuring unit. The coarse-measuring unit allows for unambiguously determining the wavelength of the incoming optical beam over a first wavelength range. The fine-measuring unit provides an ambiguous wavelength determination for the incoming optical beam, however with a higher accuracy than the accuracy of the coarse-measuring unit. Although the wavelength determination of the fine-measuring unit is ambiguous within the first wavelength range (e.g. since it provides a periodic wavelength dependency), it is provided to be unambiguous in each of a plurality of unambiguous wavelength ranges, whereby each of the plurality of unambiguous wavelength ranges is smaller than the first wavelength range.

An evaluation unit uses the result of the coarse-measuring unit for identifying one of the plurality of unambiguous wavelength ranges as a second wavelength range that covers the wavelength of the incoming optical beam. The result of the fine-measuring unit is then applied by the evaluation unit for determining the wavelength of the incoming optical beam within that identified second wavelength range.

In other words, the result of the coarse-measuring unit represents a first wavelength value with a first accuracy. However, since the measured value of the fine-measuring unit is generally ambiguous (i.e. plural wavelength values correspond to the measured value of the fine-measuring unit)

but only unambiguous within each of the plurality of unambiguous wavelength ranges (i.e. within each of the plurality of unambiguous wavelength ranges, only one wavelength value corresponds to the measured value of the fine-measuring unit), the evaluation unit selects—as the second wavelength range—the one of the plurality of unambiguous wavelength ranges (of the fine-measuring unit) that covers the first wavelength value as provided by the coarse-measuring unit. With the information of the second wavelength range, the evaluation unit can then determine a second wavelength value as the one wavelength value corresponding to the measured value of the fine-measuring unit within the second wavelength range. The second wavelength value then represents the measuring result of the wavemeter for the wavelength of the incoming optical beam.

Thus, the wavemeter according to the invention allows determining the wavelength of the incoming optical beam within the first wavelength range and with the accuracy of the fine-measuring unit.

In case that the fine-measuring unit provides a periodic wavelength dependency, it is clear that in order to provide reasonable measuring results for the wavelength of the incoming optical beam, the periodicity (e.g. the wavelength range in which the fine-measuring units is unambiguous) of the wavelength-dependency of the fine-measuring unit has to be larger than the measuring fault or inaccuracy of the coarse-measuring unit.

In a preferred embodiment, the coarse-measuring unit employs one or more materials with a wavelength-dependency of characteristic properties, such as reflection and/or transmission. The applicable wavelength range can be controlled by selecting the respective materials as well known in the art.

Suitable materials, e.g. for providing a wavelength-dependency of a coating, can be for example MgF2, SiO, or CeF3. Preferred embodiments of the coarse-measuring unit are dielectric filters, wherein the reflectivity-and transmission-characteristics changes unambiguously within the wavelength range of interest. Dual detectors, wherein the incoming beam is split up and provided to detectors with different response characteristics over the wavelengths can be applied accordingly.

In one embodiment, the coarse-measuring unit employs a dielectric coating consisting of one or more layers of materials (e.g. $MgF_2$, SiO, $CeF_3$) with different refractive indices and thickness. The coating structure has to be designed, as well known in the art, to achieve unambiguous reflectivity-and/or transmission-characteristics within the wavelength range of interest.

In a more specific embodiment, the coarse-measuring unit comprises a glass plate with a dielectric coating on one side and an anti-reflection coating on the other side, thus representing a wavelength-dependent beamsplitter. Preferably, the dielectric coating provides a high wavelength-dependent reflection/transmission characteristics, and the anti-reflection coating is optimized for providing minimum reflection to avoid light disturbances coming from the second surface that might falsify the transmission and reflection characteristics of the dielectric coating. The beams separated by the wavelength-dependent beamsplitter are preferably launched to photodiodes for measuring the characteristic properties, such as reflection and/or transmission of the dielectric coating. The applicable wavelength range can be controlled by selecting the respective materials.

A preferred embodiment of the fine-measuring unit makes use of the interferometric principle, such as the Fizeau interferometer or uses a combination of different etalons (which can be also realized based on polarization effects)as disclosed in detail in the aforementioned EP-A-875743. Those interferometric units generally provide a periodic dependency over the wavelength, but exhibit a higher resolution than the units employing wavelengths dependent material properties. However, due to the periodicity of the wavelength dependency from the interferometric measurement, the periodicity of the wavelength-dependency of the fine-measuring unit should be larger than the measuring fault or inaccuracy of the coarse-measuring unit.

In a further preferred embodiment, the wavemeter according to the invention further comprises an absolute-measuring unit making use of unambiguous wavelength properties, e.g. absolutely known transmission features as provided e.g. by gas absorption cells. In such gas absorption cells, the incoming light is passed through a gas cell acting as an optical filter having absolutely known transmission features, preferably known absorption lines of the gas. Such filters are described e.g. in US-A-5,780,843 for controlling high accuracy tunable laser sources.

Each measuring unit (i.e. the coarse-measuring unit, the fine-measuring unit, and, if available, the absolute-measuring unit) of the wavemeter is coupled to the evaluation unit receiving measuring signals (e.g. optical power values) from each of the measuring units, and determining the wavelength of the incoming optical signal therefrom. This can preferably be done using calibrated look-up tables for the coarse-and fine-measuring unit. One or more correction (offset) values coming from the absolute-measuring unit can be applied in addition as will be described later.

Since the absolute-measuring unit generally only allows unambiguously determining discrete wavelengths but does not for a continuous spectrum, the absolute-measuring unit is preferably provided for reference measurement(s). The wavemeter thus provides a corrected output (representing the wavelength(s) of the incoming beam(s))by using the unambiguous wavelength properties of the absolute-measuring unit for calibrating the wavemeter. The reference measurement is preferably applied for calibrating the wavemeter before an actual measurement.

Preferably for (absolutely) calibrating the wavemeter, an input signal is swept over a wavelength range wherein the absolute-measuring unit has at least one of the known absolute wavelength characteristics. By analyzing the measured transmitted power of the absolute-measuring unit together with the wavelength-results derived from the coarse-measuring unit and/or the fine-measuring unit, a relation between the absolutely known transmission features and the derived wavelength-results can be established. This can result in one or more correction (offset) values relating to an e.g. factory based calibration of the wavemeter.

Since a reference measurement employing the absolute-measuring unit generally requires a wavelength sweep, it is clear that a continuous calibration is only applicable as long as a wavelength sweep is applied at all, and as long as the wavelength sweep covers at least one of the unambiguous wavelength properties of the absolute-measuring unit.

The necessity of calibration generally depends on the wavelength stability and/or wavelength characteristics of the coarse-measuring unit and/or the fine-measuring unit, which may be influenced by temperature, mechanical shock or aging.

Thus, the invention provides a wavemeter allowing to assign with a higher precision and accuracy a wavelength to an incident light beam. The applicable wavelength range of the wavemeter can be adjusted by selecting or designing the wavelength-dependencies of the coarse-measuring unit and/or the fine-measuring unit.

The term 'monochromatic light' in the context of this invention shall mean small-bandwidth light with substantially one dominating characteristic wavelength.

It is clear that the invention can be partly or entirely embodied by one or more suitable software programs, which can be stored on or otherwise provided by any kind of data carrier, and which might be executed in or by any suitable data processing unit. In particular, software programs might be applied by the unit and for controlling a wavelength sweep of a light source.

BRIEF DESCRIPTION OF THE DRAWINGS

Other objects and many of the attendant advantages of the present invention will be readily appreciated and become better understood by reference to the following detailed description when considered in connection with the accompanied drawings. Features that are substantially or functionally equal or similar will be referred to with the same reference sign(s).

DETAILED DESCRIPTION OF THE INVENTION

Figure 1:
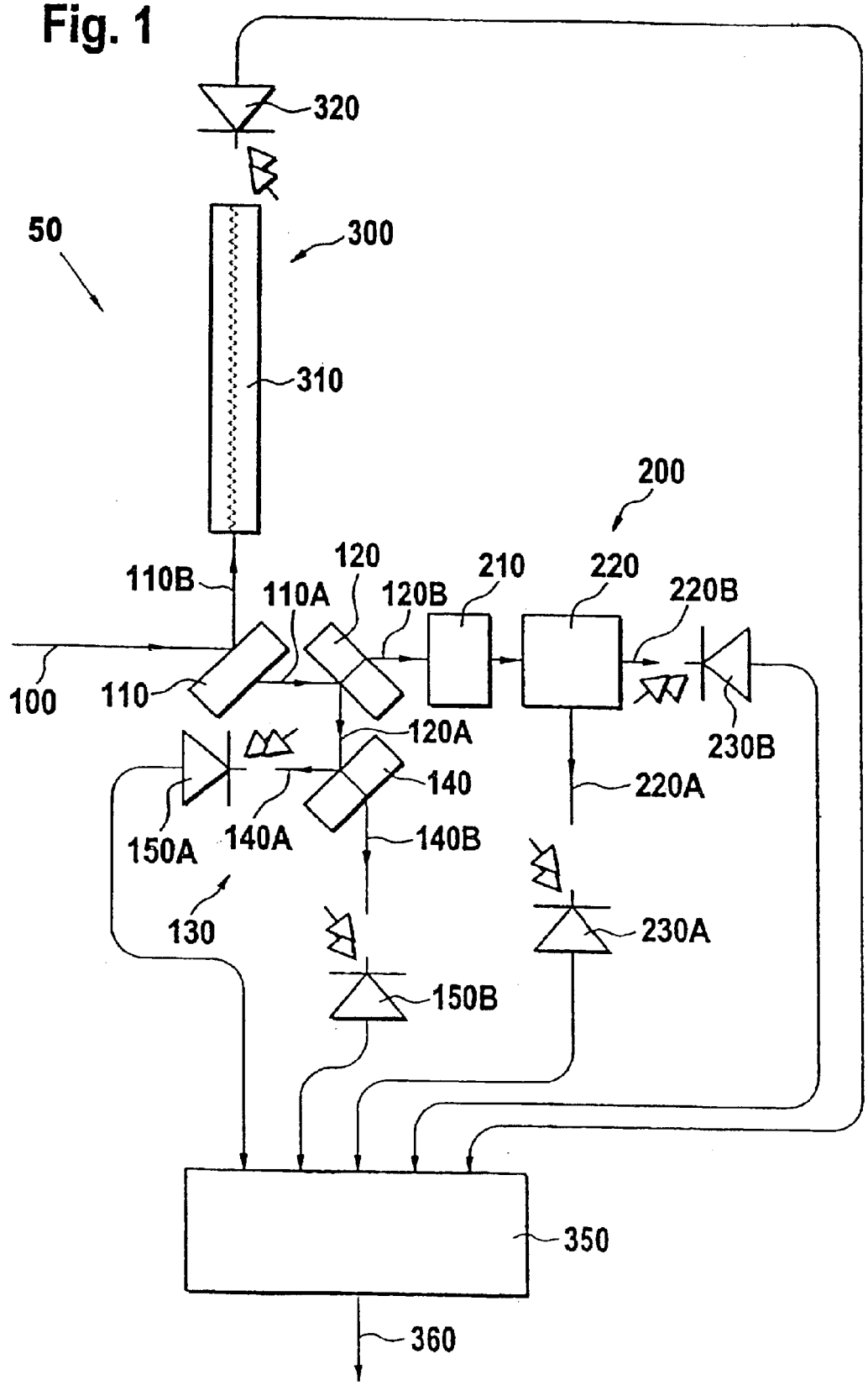
FIG. 1 shows a preferred embodiment of a wavemeter 50 according to the invention.

FIG. 1 shows a preferred embodiment of a wavemeter 50 according to the invention. An incident light beam 100 is split by a first beam splitter 110 into beams 110A and 110B. The beam 110A is then again split up by a second beam splitter 120 into beams 120A and 120B. The beam 120A is directed towards a coarse-measuring unit 130 consisting of a third beam splitter 140 and two detectors 150A and 150B. The third beam splitter 140 splits up beam 120A into a beam 140A towards the detector 150A and a beam 140B directed towards the detector 150B. Either the third beam splitter 140 or the two detectors 150A and 150B comprise materials with a wavelength-dependency of the characteristics. Preferably, the third beam splitter 140 provides a coupling-ratio between the beams 140A and 140B which is dependent on the wavelengths. In a preferred embodiment, the coarse-measuring unit 130 comprises a glass plate with a dielectric coating (PRC) on one side and an anti-reflection coating (ARC) on the other side, thus providing a wavelength dependent beamsplitter (WDBS). The PRC has a high wavelength-dependent reflection/transmission-characteristics, and the ARC is optimized for minimum reflection to avoid light disturbances coming from the second surface falsifying the PRC transmission and reflection characteristic. The beams 140A and 140B separated by the WDBS are launched to the two detectors 150A and 150B (e.g. photodiodes) for measuring the characteristic properties, such as reflection and/or transmission, of the PRC.

Figure 2:
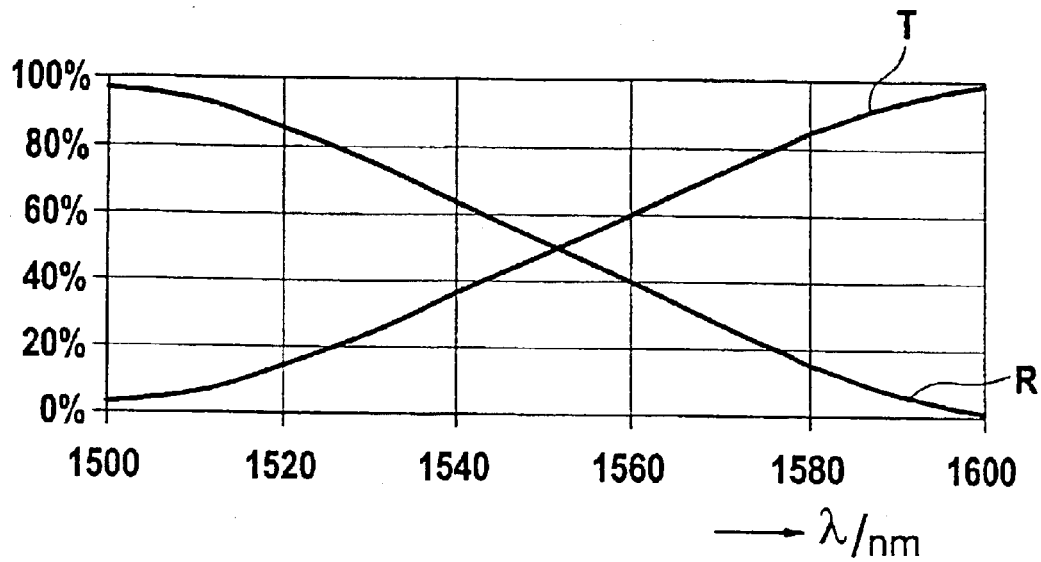
FIG. 2 shows an example of a wavelength-dependency of the third beam splitter 140.

FIG. 2 shows an example of a wavelength-dependency of the coupling ratio between the beams 140A and 140B of the third beam splitter 140. The third beam splitter 140 exhibits a transmission characteristics T, which increases from roughly 5% at 1500 nm to 98% at 1600 nm, and a reflection characteristics R, which decreases from roughly 95% at 1500 nm to 2% at 1600 nm. It is clear that T+R=1 has to be fulfilled in the ideal case. In this example, the (applicable) range of the wavelength λ is selected to cover approximately 1500–1600 nm as the currently applied 'telecommunication window'.

The beam 120B from the second beam splitter 120 is directed towards a fine measuring unit 200. The fine-measuring unit 200 applies the principle of interferometry for determining the wavelengths of the beam 120B. The fine measuring unit 200 might comprise a single etalon element or two etalon elements in combination, both as described in the aforementioned EP-A-875743. Alternatively end as shown by the example of FIG. 1, a single birefringent element 210, e.g. a λ/8 retardation plate, in combination with a respective polarizing beam splitter 220 can be applied accordingly, as also disclosed in detail in the aforementioned EP-A-875743. In this case, one birefringent quartz plate 210 fulfils the functions of two etalons, wherein the corresponding transmission signals are separated spatially. This optical component has two major optical axes, which are different in optical thickness, and the signal separation is done based on orthogonal states of polarization. Light from the polarizing beam splitter 220 is split up into a beam 220A launched to a detector 230A, and into a beam 220B launched to a detector 230B.

Figure 3:
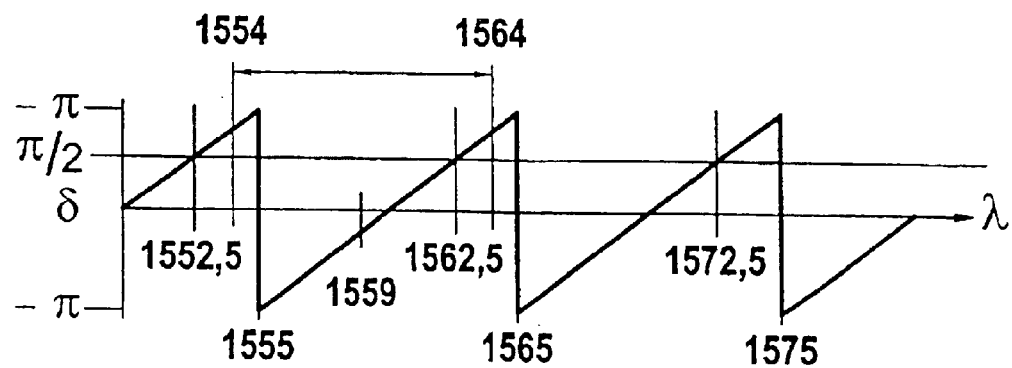
FIG. 3 depicts an example of a wavelength-dependency of the fine-measuring unit 200.

FIG. 3 depicts an example of a wavelength-dependency of the fine-measuring unit 200, which substantially represents a tangent relationship for a determined value λ over the wavelength (cf. also FIGS. 6 and 7 and the accompanying description of the aforementioned EP-A-875743 which shall be incorporated herein by reference). For the sake of simplicity, only a part of the wavelength-dependency is shown in FIG. 3. It is clear that the accuracy of the tangent relationship over the wavelength depends on the specific arrangement and wavelength properties of the components of the fine-measuring unit 200.

The wavemeter 50 might further comprise an absolute-measuring unit 300 with a gas absorption cell 310. The incoming light beam 110B is passed through gas absorption cell 310 acting as an optical filter having absolutely known transmission features, namely known absorption lines of the gas. Such filters are described in detail e.g. in the aforementioned US-A-5,780,843. Light transmitted through the gas absorption cell 310 is then detected by a detector 320.

The detectors 150A, 150B, 230A, 230B, and, if available, 320 are coupled to an evaluation unit 350 having an output 360.

In operation for determining the wavelength of the incident light beam 100, the evaluation unit 350 receives measuring signals from the two detectors 150A and 150B of the coarse-measuring unit 130, and determines therefrom either a reflection value or a transmission value. It is clear and also apparent from FIG. 2 that the reflection value and the transmission value correspond to each other, and both represent a first wavelength value. In an example in conjunction with FIG. 2, the evaluation unit 350 determines a reflection value R of 40% (corresponding a transmission value of 60%), which corresponds to a wavelength of 1560 nm as the first wavelength value.

Accordingly, the evaluation unit 350 receives measuring signals from the two detectors 230A and 230B of the fine-measuring unit 200, and determines therefrom the corresponding λ-value. Due to the ambiguity of the wavelength dependency, the determined λ-value will generally correspond to a plurality of different wavelength values.

In order to select one of the plurality of different wavelength values as determined by the fine-measuring unit 200, the evaluation unit 350 determines a target wavelength range around the first wavelength value as determined by the coarse unit 130. The target wavelength range is preferably determined by the first wavelength value plus/minus half of the period (equivalent to the free spectral range -FSR; see the aforementioned EP-A-875743 for further details) of the wavelength-dependency of the fine-measuring unit 200. The one of the plurality of different wavelength values, as determined by the fine-measuring unit 200, that falls within the target wavelength range is then determined as a second wavelength value. The second wavelength value then represents the measuring result of the wavemeter 50 for the wavelength of the incoming optical beam 100, and can be output e.g. at the output 360.

It is clear that the target wavelength range can also be determined otherwise, e.g. as the one of a plurality of predefined wavelength ranges that covers the first wavelength value. Also, in case that the period of the wavelength-dependency of the fine-measuring unit 200 is not constant, the period to be added/subtracted is preferably adjusted to the actual dependency or derived therefrom.

In an example in conjunction with FIG. 3, the evaluation unit 350 determines a λ-value of π/2, which corresponds to wavelength values of 1552,5 nm, 1562,5 nm, and 1572,5 nm (or in general 1552,5 nm plus/minus multiple FSR). The first wavelength value as determined by the coarse unit 130 shall in this example be 1559 nm.

The evaluation unit 350 determines the target wavelength range by adding/subtracting half of the period (the period in the example of FIG. 3 shall be 10 nm) around the first wavelength value 1559 nm. This leads to the target wavelength range of 1554–1564 nm (indicated by the arrow in FIG. 3). Since the wavelength value of 1662,5 nm as determined by the fine-measuring unit 200 falls within that target wavelength range, the evaluation unit 350 will determine 1662,5 nm as the second wavelength value, and output 1662,5 nm as the measuring result of the wavemeter 50 for the wavelength of the incoming optical beam 100.

In the above example, any determined wavelength value of the coarse unit 130 between 1557,5 nm and 1567,5 nm will lead to 1562,5 nm as the true wavelength of the input signal 100. Correspondingly, any wavelength below 1557,5 nm will select 1552,5 nm, any wavelength higher 1567,5 nm will select 1572,5 nm.

The wavemeter 50 might be calibrated by launching light at different wavelengths thereto. At each wavelength step, the optical power at the detectors 150A, 150B, 230A, 230B, and 320 is measured, generating a power value set $P_\lambda$ for each wavelength λ, and the evaluation unit 350 receives that power value set $P_\lambda$. Simultaneously, a calibrated high accuracy reference wavemeter (not shown) is connected also to the wavemeter 50 and determines the actual wavelength λ. The measured values Pλ and λ may result in one or more look-up tables which will be used later by the evaluation unit 350 to determine an unknown wavelength based on the measured power values $P_\lambda$. The wavelengths at which the calibration is done have to be chosen according to the wavelength range of interest and the degree of the desired accuracy.

The wavemeter 50 can be calibrated as described above, and the coarse-measuring unit 130 may be also calibrated with the absolute-measuring unit 300 as often as necessary according to the stability of the coarse-measuring unit 300. If an unknown signal (input beam 100) is launched into the wavemeter 50, the respective power values $P_\lambda$ are measured with the photodiodes 150A, 150B, 230A, and 230B of the coarse-and fine-measuring units 130 and 200, and received by the evaluation unit 350. In the simplest way, these power values $P_\lambda$ are used by the evaluation unit 350 applying a searching algorithm to find the corresponding λ-value in pre-defined look-up tables. Between the calibrated values, the unknown wavelength may be determined by interpolation algorithm. These described controlling mechanism software may also be running on an external PC software. The λ-value is then output at output 360.

In another operation mode, the input signal of beam 100 is swept over a larger wavelength range, and e.g. a part of it is separated to characterize the transmission parameter (e.g. insertion loss) of an optical component (not shown). The power values $P_\lambda$ measured with the wavemeter 50 are measured at the same time as the parameter of the optical component by use of a (not shown) trigger-unit. The corresponding λ-value may be calculated by the evaluation unit 350 during or after the sweep. Depending on the trigger-unit, an absolute high-accuracy wavelength measurement of the parameter under test is possible. If the absolutely known transmission features of the absolute-measuring unit 300 is within the wavelength range of the wavelength sweep, the coarse-measuring unit 130 can also be recalibrated afterwards.

What is claimed is:

1. A wavemeter for determining a wavelength of an incoming optical beam comprising:

a coarse-measuring unit for determining in a first wavelength range and with a first accuracy, a first wavelength value as representing the wavelength of the incoming optical beam, a fine-measuring unit for providing a wavelength determination with a second accuracy for the incoming optical beam, wherein the wavelength determination is ambiguous within the first wavelength range but unambiguous in each of a plurality of unambiguous wavelength ranges, so that a plurality of different wavelength values correspond to a measuring value as measured by the fine-measuring unit for the incoming optical beam and wherein the second accuracy is higher than the first accuracy, an evaluation unit for determining a second wavelength range covering the first wavelength value, and for determining a second wavelength value as the one of the plurality of different wavelength values that corresponds to the measuring value in the second wavelength range, and output means for providing the second wavelength value as a measuring result of the wavemeter representing the wavelength of the incoming optical beam, wherein the coarse-measuring unit comprises a beam splitter adapted for splitting up a received beam derived from the incoming optical beam into a first beam towards a first detector and a second beam directed towards a second detector, and wherein the beam splitter provides a coupling-ratio between the first and second beams which is dependent on the wavelength of the received optical beam.

2. The wavemeter of claim 1, wherein the fine-measuring unit comprises means for providing a periodic wavelength dependency, the periodicity of the wavelength-dependency being larger than a measuring fault or inaccuracy of the coarse-measuring unit.

3. The wavemeter of claim 1, wherein the coarse-measuring unit comprises a dielectric coating having one or more layers of materials, chosen from the group of MgF2, SiO, or CeF3, with different refractive indices and thickness.

4. The wavemeter of claim 1, wherein the coarse-measuring unit comprises a glass plate with a dielectric coating on one side and an anti-reflection coating on another side, thus representing a wavelength-dependent beamsplitter.

5. The wavemeter of claim 1, further comprising an absolute-measuring unit having unambiguous wavelength properties.

6. A method for determining a wavelength of an incoming optical beam comprising:
   determining in a first wavelength range and with a first accuracy a first wavelength value as representing the wavelength of the incoming optical beam,
   providing a wavelength determination with a second accuracy for the incoming optical beam, wherein the wavelength determination is ambiguous within the first wavelength range but unambiguous in each of a plurality of unambiguous wavelength ranges, so that a plurality of different wavelength values correspond to a measuring value as measured for the incoming optical beam, and wherein the second accuracy is higher than the first accuracy,
   determining a second wavelength range covering the first wavelength value,
   determining a second wavelength value as the one of the plurality of different wavelength values that corresponds to the measuring value in the second wavelength range, and
   providing the second wavelength value as measuring result representing the wavelength of the incoming optical beam;
   wherein the first wavelength range is determined by a coarse-measuring unit comprising a beam splitter adapted for splitting up a received beam derived from the incoming optical beam into a first beam towards a first detector and a second beam directed towards a second detector, and wherein the beam splitter provides a coupling-ratio between the first and second beams which is dependent on the wavelength of the received optical beam.

7. The method of claim 6, further comprising:
   providing a reference measurement from an absolute-measuring unit having unambiguous and absolutely known wavelength properties.

8. The method of claim 7, wherein providing a reference measurement is executed prior to determining in a first wavelength range and with a first accuracy a first wavelength value, for calibration before an actual measurement.

9. The method of claim 7, wherein providing a reference measurement comprises:
   sweeping an input signal over a wavelength range wherein the absolute-measuring unit has at least one of the unambiguous and absolutely known wavelength properties,
   analyzing a measuring result derived from sweeping an input signal over a wavelength range, together with a measuring result derived from determining in a first wavelength range and with a first accuracy, a first wavelength value, and
   providing a wavelength determination with a second accuracy for the incoming optical beam, for determining a relation between the unambiguous and absolutely known wavelength properties and the derived measuring result(s).

10. The method of claim 7, wherein providing a reference measurement is executed for calibrating a wavemeter, and/or for adjusting measuring results as provided by the wavemeter, said wavemeter comprising:
   a coarse-measuring unit for determining in a first wavelength range and with a first accuracy a first wavelength value as representing the wavelength of the incoming optical beam,
   a fine-measuring unit for providing a wavelength determination with a second accuracy for the incoming optical beam, wherein the wavelength determination is ambiguous within the first wavelength range but unambiguous in each of a plurality of unambiguous wavelength ranges, so that a plurality of different wavelength values correspond to a measuring value as measured by the fine-measuring unit for the incoming optical beam and wherein the second accuracy is higher than the first accuracy, an evaluation unit for determining a second wavelength range covering the first wavelength value, and for determining a second wavelength value as the one of the plurality of different wavelength values that corresponds to the measuring value in the second wavelength range, and
   output means for providing the second wavelength value as measuring result of the wavemeter representing the wavelength of the incoming optical beam,
   wherein the coarse-measuring unit comprises one or more materials having a wavelength-dependency of reflection and/or transmission.

11. The method of claim 7, wherein determining a second wavelength range covering the first wavelength value comprises determining the second wavelength range as a wavelength range around the first wavelength value.

12. The method of claim 11, wherein the second wavelength range is determined by adding and subtracting a value.

13. A software product, for executing a method for determining a wavelength of an incoming optical beam, when run on a data processing system such as a computer, said method comprising:
   determining in a first wavelength range and with a first accuracy a first wavelength value as representing the wavelength of the incoming optical beam,
   providing a wavelength determination with a second accuracy for the incoming optical beam, wherein the wavelength determination is ambiguous within the first wavelength range but unambiguous in each of a plurality of unambiguous wavelength ranges, so that a plurality of different wavelength values correspond to a measuring value as measured for the incoming optical beam, and wherein the second accuracy is higher than the first accuracy,
   determining a second wavelength range covering the first wavelength value,
   determining a second wavelength value as the one of the plurality of different wavelength values that corresponds to the measuring value in the second wavelength range, and
   providing the second wavelength value as measuring result representing the wavelength of the incoming optical beam
   wherein the first wavelength range is determined by a coarse-measuring unit comprising a beam splitter adapted for splitting up a received beam derived from the incoming optical beam into a first beam towards a first detector and a second beam directed towards a second detector, and wherein the beam splitter provides a coupling-ratio between the first and second beams which is dependent on the wavelength of the received optical beam.

14. The software product of claim 13, wherein said software product is stored on a data carrier.

15. The wavemeter of claim 1, further comprising an absolute-measuring unit having unambiguous wavelength properties, including absolutely known transmission features provided by a gas absorption cell.

16. The method of claim 6, further comprising:

providing a reference measurement from an absolute-measuring unit having unambiguous and absolutely known wavelength properties, including absolutely known transmission features provided by a gas absorption cell.

17. The method of claim 7, wherein providing a reference measurement is executed concurrently with determining in a first wavelength range and with a first accuracy, a first wavelength value, and providing a wavelength determination with a second accuracy for the incoming optical beam, for providing a continuous calibration.

18. The method of claim 7, wherein providing a reference measurement is executed concurrently with determining in a first wavelength range and with a first accuracy, a first wavelength value, or providing a wavelength determination with a second accuracy for the incoming optical beam, for providing a continuous calibration.

19. The method of claim 7, wherein providing a reference measurement comprises:

sweeping an input signal over a wavelength range wherein the absolute-measuring unit has at least one of the unambiguous and absolutely known wavelength properties, analyzing a measuring result derived from sweeping an input signal over a wavelength range together with a measuring result derived from determining in a first wavelength range and with a first accuracy, a first wavelength value, or providing a wavelength determination with a second accuracy for the incoming optical beam, for determining a relation between the unambiguous and absolutely known wavelength properties and the derived measuring result(s).

20. The method of claim 11, wherein the second wavelength range is determined by adding and subtracting a value corresponding to half of the period of the unambiguous wavelength range covering the first wavelength value, to and from the first wavelength value.

21. A method for determining a wavelength of an incoming optical beam, comprising:

receiving first signals from a first and a second detector disposed in a coarse-measuring unit;

determining a first wavelength value from said first signals;

receiving second signals from a third and a fourth detector disposed in a fine-measuring unit;

determining a plurality of second wavelength values from said second signals;

selecting a value of said plurality of second wavelength values by determining a target wavelength range around said first wavelength value and selecting said second wavelength value that falls within said target wavelength range; and providing said second wavelength value as said wavelength of said incoming optical beam.

22. The method according to claim 21, wherein said target wavelength range is one of a plurality of predefined wavelength ranges that cover said first wavelength value.

23. The method according to claim 21, wherein said target wavelength range is determined by adding a half of a period around said first wavelength value.

24. The method according to claim 21, wherein said target wavelength range is determined by subtracting a half of a period around said first wavelength value.

25. The method according to claim 21, further comprising:

calibrating a wavemeter having said coarse-measuring unit and said fine-measuring unit in order to generate a power value set; and storing said power value set in a look-up table that is capable of being used to determine an unknown wavelength based on measured power values.

26. The method according to claim 25, wherein said coarse-measuring unit is calibrated with an absolute-measuring unit and further comprising:

finding a value in said look-up table that corresponds to a received power value.

27. The wavemeter of claim 1, wherein said fine-measuring unit comprises:

a birefringent element for introducing a phase shift on different polarization states of said incoming optical beam; and a polarizaring beam splitter in combination with said birefringent element adapted for splitting a received beam derived from said birefringent element into a third beam towards a third detector and a fourth beam directed towards a fourth detector, providing a tangent relationship between said third beam and said forth beam.

* * * * *